Nov. 2, 1965   J. H. DAVIS   3,215,026
BLIND PRESS NUT DEVICES
Original Filed June 15, 1961
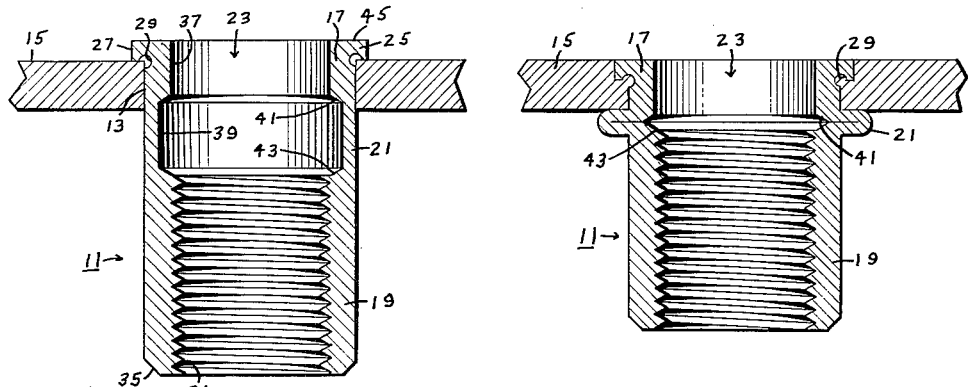
Fig.1   Fig.2
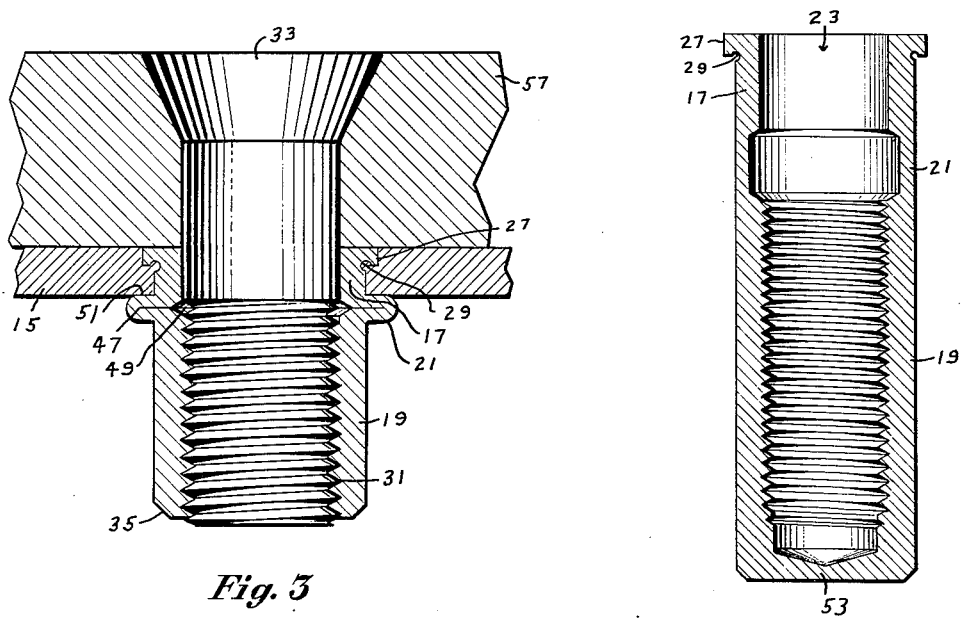
Fig. 3   Fig. 4
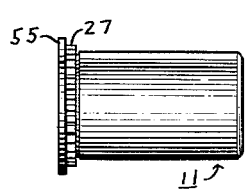   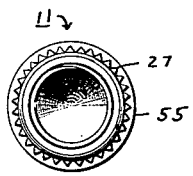
Fig. 5   Fig. 6
INVENTOR.
John H. Davis
BY
Wm. T. Wofford
Attorney

United States Patent Office 3,215,026
Patented Nov. 2, 1965

3,215,026
BLIND PRESS NUT DEVICES
John H. Davis, Rte. 8, Box 693, Fort Worth, Tex.
Continuation of application Ser. No. 117,322, June 15, 1961. This application Mar. 10, 1965, Ser. No. 445,823
4 Claims. (Cl. 85—70)

This application is a continuation of my copending application, Serial No. 117,322, filed June 15, 1961, and now abandoned.

My invention relates generally to attachment devices, and more particularly to fastener receiving devices which are especially adapted for installation in a structural member, and which may also be referred to as blind press nut devices.

In the fabrication of machinery, equipment, aircraft, and other devices, it is often necessary to provide fastener receiving means in a substructure in order to attach other structural components thereto. In most cases it is possible to employ conventional nuts which engage bolts on the inside of such substructure. However, the nature of the structure often precludes the use of a nut on the inside of the substructure, e.g., where the inside of the substructure is inaccessible, or where another structural element is positioned sufficiently near the bolt hole as not to allow adequate clearance for the nut. In such situations it is necessary to provide fastener receiving means which may be installed from the outside of the substructure.

Heretofore the most generally used fastener receiving means for this purpose has been the conventional nut plate, which comprises an internally threaded shank having a pair of apertured, lateral protrusions thereon. Such nut plates are installed on the inner surface of the substructure by means of rivets extending through the protrusions and the substructure. These nut plates must be installed while there is still accessibility to the rear of the substructure. Several disadvantages are inherent in the use of nut plates. The fact that they must be installed from the underside of structures in many instances presents difficulties because of clearance and accessibility problems. Since nut plates are installed with rivets, it is necessary to drill two additional holes in the structure for each nut plate. The installation of nut plates is, therefore, time-consuming and expensive. Nut plates are unsatisfactory for use on contoured surfaces and in the area of a structural curvature.

In my copending application, Serial No. 852,747, filed November 13, 1959, and now abandoned, there is disclosed a fastener receiving device in the form of a blind press nut which generally meets the problems above mentioned, but nevertheless falls somewhat short of perfection. The present invention involves improvement over the devices disclosed by the said copending application and seeks a closer approach to perfection. The devices of the present invention have all of the advantages outlined by the said copending application plus several important additional advantages.

The primary difference between the fastener receiving devices of the present invention and those of the said copending application resides in the bellows portion of the devices. In the devices of the said copending application, the bellows portion was formed by removing a portion of the material about the outer peripheral region of the bellows portion, thus reducing wall thickness in that region, and then slightly bowing or bulging the bellows portion outwardly. I have found that a bellows portion thus formed is subject to several disadvantages.

First, in installed position the bellows portion which contacts the supporting structure is not fully flush with it, and also, the bellows inner wall is folded so as to form a toroidal void. These characteristics significantly reduce the optimum shear strength of the installation. Second, the compression strength of the installation is less than optimum, for reasons to be hereinafter explained. Third, the accuracy of the bellows folding action is less than optimum.

Thus, the general object of the present invention is to provide fastener receiving devices which embody improvements over those disclosed by my said copending application.

Another object of the present invention is to obviate the disadvantages of the devices as disclosed by the copending application, as above mentioned.

Another object of the present invention is to provide fastener receiving devices which will result in installations having greater shear strength characteristics, greater compression (and/or tension) strength, and greater bellows forming or expansion accuracy.

These and other objects are effected by my invention as will be apparent from the following description, taken in accordance with the accompanying drawings, forming a part of this application, in which:

FIGURE 1 is a schematic section view showing the improved press nut inserted into a substructure (supporting structure) prior to permanent installation therein;

FIGURE 2 is a schematic section view showing the press nut of FIGURE 1 after permanent installation thereof in the supporting structure;

FIGURE 3 is a schematic section view showing a completed press nut installation, with a second structural component 57 being held in fixed relation to the substructure hereinbefore mentioned, by means of the press nut fastener device;

FIGURE 4 shows the press nut like that of FIGURES 1, 2 and 3, except adapted for applications wherein it is desired to form a fluidtight seal at the attachment locations;

FIGURE 5 is a schematic elevational view showing a press nut which is like the press nut of FIGURES 1, 2 and 3, except that it is provided with an upper flange ring; and, FIGURE 6 is a plan view of the press nut of FIGURE 5, looking at the bottom end thereof.

Referring now to the drawings, in FIGURE 1 the fastener receiving device or press nut 11 is shown inserted within a circular opening 13 in a substructure 15. The press nut 11 includes a head portion 17, a shank portion 19, and a bellows portion 21. An axial aperture extends through the press nut 11, as indicated at 23. The head portion 17 is provided with an integral circumferential collar 25 having longitudinal serrations 27 about the periphery thereof. A groove 29 is formed about the circumference of the head portion adjacent the lower surface of the collar 25, for a purpose which will be explained in connection with the description of FIGURE 2. The shank portion 19 is provided with internal threads 31 for engaging a fastener bolt 33 inserted into the aperture 23. It is desirable that the shank portion 19 be chamfered at the lower edge thereof, as indicated at 35, to facilitate insertion of the press nut 11 into the opening 13.

In the fabrication of the press nut, a portion of the material is removed from the inner peripheral region of the press nut aperture 23 between the head portion 17 and the threaded portion 19 (the bellows regions), thus reducing the press nut wall thickness in the bellows region 21. The axial ends of this bellows region are bevelled or tapered, for a purpose to be presently explained. Thus the exterior wall of the press nut between the collar 25 and the bottom chamfered portion 35 is cylindrical, having a constant diameter. The head portion inner surface 37 is cylindrical, having a diameter such as to produce a close fit with the fastener bolt 33 that is to be used with the press nut 11, while the threaded portion 19 is of course of diameter of such as to properly engage the threads of the bolt. The bellows portion inside surface consists of a cylindrical portion 39 having diameter greater than that of the head portion, an upper bevel 41 tapering inwardly and upwardly from the bellows cylindrical portion upper margin and merging with the head portion inner surface 37, and a lower bevel 43 tapering inwardly and downwardly from the cylindrical portion lower margin and merging with the threaded portion 31.

In order to described the manner in which the press nut 11 is installed in the substructure 15, reference is now made to FIGURE 2. For installation, means (not shown) are provided for exerting opposite compression forces of the required magnitude on the threaded and head portions of the nut in order to properly expand the bellows portion 39 against, and seat the serrated collar portion 25 in, the substructure 15. The means for exerting the forces above-mentioned is preferably a power tool (not shown) having an anvil adapted for bearing against the outer end 45 of the press nut head portion 17, a bolt for engaging the press nut threaded portion 31, means for screwing and unscrewing the bolt onto the press nut, and means for exerting tension on the bolt to force the press nut threaded portion 31 toward the head portion 17 while holding the bolt against rotation, thus expanding the bellows portion 21 and pulling the collar 25 into seated position on the substructure 15.

Thus, a preferred manner of installation would be to first thread the press nut 11 onto the tool bolt (mandrel) then position the nut on the substructure 15 (as in FIGURE 1), then activate the tool mandrel tensioning means, causing the bellows 21 to expand. As the bellows expands, the collar 25 is pulled down into its seated position in the substructure 15.

As hereinbefore stated the structure and configuration of the press nut bellows portion 21 is the primary feature of the present invention. The tapered reduction of the press nut inner wall 39 by means of the upper and lower bevels 41, 43 provides a force plane action which is of primary significance for several reasons (see FIGURE 3).

First, the slope of the bevels 41, 43 accurately determine the point (line) at which the bellows 21 will have its apex 47. This apex will always occur at the line of intersection of the bevel extension cones. This is because the compression forces at the bevel region will resolve into total force components acting on a line parallel to the respective bevel 41, 43. Since the apex line of the bellows can be accurately predicted, the bellows can be dimensioned relative to the collar thickness and the substructure thickness so that the collar will be pulled into perfect setting position and the bellows will bear snugly against the substructure inner surface. As the collar 25 is pulled down into the substructure 15, the substructure material displaced by the serrations 27 will flow into and fill the peripheral groove 29. After installation of the press nut into the substructure, the serrations 27 function to prevent rotation of the press nut relative to the substructure, thus allowing the press nut to accept torqueing forces without rotating in the substructure. Second, the bellows 21 will fold so as to have its inner surface on opposite sides of the apex 47 in continuous mutual abutting contact, so that the only void between the press nut inner surface and the fastener bolt 33 is the very small toroid 49 formed between the bevelled surfaces 41, 43 and the bolt threads. The lack of any significant void means that the press nut 11 is for all practical purposes integral with the fastener bolt 33, allowing no room for play, and thus greatly increasing the shear strength of the installation. Third, since the inner faces of the bellows 21 are in contiguous abutting relation when the bellows has been expanded, there can be no play in the press nut axial direction. Also, tension force on the bolt 33 produces compression forces on the press nut shank portion 19, which forces are resolved by the force plane of the lower bevel 43 into an upward and outward direction, thus causing such forces to be concentrated on the substructure 15 at the region in contact with the bellows upper surface 51, instead of on the press nut head portion 17, thus greatly increasing the resistance of the press nut installation to such tension forces.

In some applications, for example aircraft fuel tanks, where it is necessary to form a fluidtight seal at the fastener location, the modification shown by FIGURE 4 may be utilized. In this embodiment, the lower end of the shank portion is closed as indicated at 53. Also, a suitable sealant compound is applied about the head portion 17 of the press nut 11 prior to installation.

In all embodiments of the present invention, the threaded portion of the press nut may, if desired, be slightly deformed or dimpled, in order to provide a locking action.

Also, in some cases it may be desirable to incorporate an integral flange ring 55 in the press nut 11 above the collar portion 25, as shown in FIGURES 5 and 6.

Although only certain preferred embodiments of the invention have been specifically illustrated and described herein, it is to be understood that the invention is not limited thereto, as many variations and modifications will be apparent to those skilled in the art, and the invention is to be given its broadest possible interpretation within the spirit and scope of the appended claims.

I claim:

1. A fastener bolt receiving device for installation in a substructural member adapted to have secured thereover a second structural member and, comprising a head portion adapted, when installed, to lie flush with the upper surface of said substructural member, means integral with said head portion for locking said device against rotation within said substructural member, an internally threaded shank portion, and an expansible bellows portion intermediate said head and shank portions, said head, shank, and bellows portions presenting an integral constant diameter cylindrical exterior surface, said device having an axial aperture therein with the diameter of the inner surface of said head portion and said shank portion thread major diameter being substantially equal, with said bellows having an inner cylindrical surface of greater diameter than said head portion and said shank portion, an upper bevel extending upwardly and inwardly from said bellows inner cylindrical surface upper margin and merging with the inner surface of said head portion to establish a first force plane, and a lower bevel extending downwardly and inwardly from said bellows cylindrical surface lower margin and merging with the inner surface of said shank portion to establish a second force plane.

2. A fastener bolt receiving device for installation in a substructural member adapted to have secured thereover a second structural member and, comprising a head portion adapted, when installed, to lie flush with the upper surface of said substructural member, including an externally serrated collar portion, an internally threaded shank portion and an expansible bellows portion intermediate said head and shank portions, said head, shank and bellows portions presenting an integral constant diameter cylindrical exterior surface, said device having an axial aperture therein with the diameter of the inner surface of said head portion and said shank portion thread major diameter being substantially equal, with said bellows having an inner cylindrical surface of greater diameter than said head portion and said shank portion, an upper bevel extending upwardly and inwardly from said bellows inner cylindrical surface upper margin and merging with the inner surface of said head portion to establish a first force plane, and a lower bevel extending downwardly and inwardly from said bellows cylindrical surface lower margin and merging with the inner surface of said shank portion to establish a second force plane.

3. A fastener bolt receiving device for installation in a substructural member adapted to have secured thereover a second structural member and, comprising a head portion adapted, when installed, to lie flush with the upper surface of said substructural member, means integral with said head portion for locking said device against rotation within said substructural member, an internally threaded shank portion, and an expansible bellows portion intermediate said head and shank portions, said head, shank and bellows portions presenting an integral constant diameter cylindrical exterior surface, said device having an axial aperture therein with the diameter of the inner surface of said head portion and said shank portion thread major diameter being substantially equal, with said bellows portion having reduced and constant wall thickness and terminating in bevels having slope such as to provide a predetermined force plane action when said bellows is expanded.

4. A fastener bolt receiving device for installation in a substructural member adapted to have secured thereover a second structural member and, comprising a hollow cylindrical body having a constant diameter exterior surface and having a head portion adapted, when installed, to lie flush with the upper surface of said substructural member, means integral with said head portion for locking said device against rotation within said substructural member, an internally threaded shank portion, and an expansible bellows portion intermediate said head and shank portions, said bellows portion having a cylindrical inner surface terminating in a bevel at each end portion thereof, with each bevel extending inwardly and away from said cylindrical inner surface, the slope of said bevels being such as to provide a bellows apex at a desired predetermined location upon expansion of said bellows and with the diameter of the inner surface of said head portion and said shank portion thread major diameter being substantially equal.

References Cited by the Examiner
UNITED STATES PATENTS

| | | | |
|---|---|---|---|
| 2,030,167 | 2/36 | Miller | 85—70 |
| 2,670,021 | 2/54 | Torresen et al. | 85—70 |
| 2,685,320 | 8/54 | Rosan | 151—41.73 |
| 2,763,314 | 9/56 | Gill | 151—41.72 |
| 3,128,813 | 4/64 | Davis et al. | 151—41.72 |
| 3,136,203 | 6/64 | Davis | 85—70 |

CARL W. TOMLIN, *Primary Examiner.*